(12) United States Patent
Woike et al.

(10) Patent No.: US 8,507,619 B2
(45) Date of Patent: Aug. 13, 2013

(54) PROCESS FOR THE POLYMERISATION OF VINYL-CONTAINING MONOMERS

(75) Inventors: Ulrich Woike, Burgkirchen (DE); Heinz Klippert, Burgkirchen (DE); Jürgen Kirschner, Wesseling (DE); Peter Kammerhofer, Burgkirchen (DE)

(73) Assignee: Vinnolit Technologie GmbH & Co. KG, Burgkirchen (DE)

( * ) Notice: Subject to any disclaimer, the term of this patent is extended or adjusted under 35 U.S.C. 154(b) by 780 days.

(21) Appl. No.: 11/884,069

(22) PCT Filed: Jan. 26, 2006

(86) PCT No.: PCT/EP2006/000687
§ 371 (c)(1),
(2), (4) Date: Feb. 11, 2008

(87) PCT Pub. No.: WO2006/084584
PCT Pub. Date: Aug. 17, 2006

(65) Prior Publication Data
US 2008/0146753 A1 Jun. 19, 2008

(30) Foreign Application Priority Data
Feb. 9, 2005 (DE) .................. 10 2005 005 987

(51) Int. Cl.
*C08F 14/06* (2006.01)
*C08F 6/12* (2006.01)
*C08F 6/24* (2006.01)

(52) U.S. Cl.
USPC ............... 526/81; 422/620; 523/343; 525/53; 525/54; 526/78; 526/79; 526/80; 526/88; 526/344; 526/344.2; 526/345; 528/397;528/502 A; 528/502 D (58) Field of Classification Search
USPC ............... 526/70, 344, 344.2, 78, 79, 80, 81, 526/88, 345; 422/620; 523/343; 525/53, 525/54; 528/397, 502 A, 502 D
See application file for complete search history.

(56) References Cited

U.S. PATENT DOCUMENTS

| 2,482,056 A | | 9/1949 | Elwell et al. |
| 2,886,561 A | * | 5/1959 | Ashe, Jr. et al. .............. 528/499 |
| 2,929,808 A | | 3/1960 | Ross et al. |

(Continued)

FOREIGN PATENT DOCUMENTS

| CN | 15 46 403 A | 11/2004 |
| GB | 849120 | 9/1960 |

(Continued)

OTHER PUBLICATIONS

Nguyen, J. V., "Design, Synthesis, and Optimization of Recoverable and Recyclable Silica-Immobilized Atom Transfer Radical Polymerization Catalysts", Mar. 5, 2005, Ph.D. thesis published by Georgia Inst. Tech.*

(Continued)

*Primary Examiner* — Richard A Huhn
(74) *Attorney, Agent, or Firm* — Edwards Wildman Palmer LLP; Peter F. Corless; Christine C. O'Day (57) ABSTRACT

The invention relates to a process for the polymerization of vinyl-containing monomers such as, for example, monomeric vinyl halides, in a reaction mixture, in which process less waste is generated.

10 Claims, 4 Drawing Sheets

(56) References Cited

U.S. PATENT DOCUMENTS

| | | | |
|---|---|---|---|
| 2,979,492 A | | 4/1961 | Governale et al. |
| 3,129,207 A | * | 4/1964 | James .......................... 526/70 |
| 4,171,427 A | | 10/1979 | Ohorodnik et al. |
| 4,401,798 A | * | 8/1983 | Ceprini et al. ................ 526/84 |
| 4,461,889 A | | 7/1984 | Hanson |
| 5,342,910 A | | 8/1994 | Kling et al. |
| 5,690,830 A | * | 11/1997 | Ohtani et al. ................ 210/636 |
| 5,800,714 A | * | 9/1998 | Miller et al. ................. 210/651 |
| 6,395,793 B1 | | 5/2002 | Kadonaga et al. |
| 2002/0086954 A1 | * | 7/2002 | Lewtas et al. ................ 526/69 |
| 2002/0193455 A1 | | 12/2002 | Sasabe et al. |
| 2008/0023398 A1 | * | 1/2008 | Borisow et al. .............. 210/638 |

FOREIGN PATENT DOCUMENTS

| | | |
|---|---|---|
| GB | 2001659 A | 2/1979 |
| JP | 10-218907 A | 8/1998 |
| KR | 2004-088186 | 10/2004 |
| RU | 2144043 C1 | 1/2000 |
| RU | 2200167 C1 | 3/2003 |
| SU | 443 865 A1 | 9/1974 |
| WO | WO-9618659 A1 | 6/1996 |

OTHER PUBLICATIONS

Technical progress for PVC production; Progress in Polymer Science, 27:2070-2071, Elsevier (2002).

Harold Sarvetnick, Polyvinyl Chloride, pp. 42-43, van Nostrand Reinold Company, New York (1969).

Encyclopedia of PVC, 1:74, Nass/Heiberger, Marcel Dekker, New York (1986).

http://www.solvin.com/production/producti.htm, Produduktionsverfahren fur SolVin-PVC.

* cited by examiner

PROCESS FOR THE POLYMERISATION OF VINYL-CONTAINING MONOMERS

The invention relates to a process for the polymerisation of vinyl-containing monomers such as, for example, vinyl halides, in a reaction mixture, in which process less waste is generated.

The polymerisation of vinyl-containing monomers, such as, for example, vinyl chloride to polyvinyl chloride (PVC), is usually carried out discontinuously, using the suspension process, in fully demineralised water, as described, for example, in the review on Technical progress for PVC production, Progress in Polymer Science 27 (2002), ELSEVIER, page 2070/2071 and Harold Sarvetnick, Polyvinyl Chloride, page 42/43, van Nostrand Reinold Company, New York 1969 and Encyclopedia of PVC, Vol 1 page 74, Nass/Heiberger, Marcel Dekker, New York 1986 and http://www.solvin.com/production/producti.htm. The suspension thereby produced typically has a solids content of from 25 to 40%. Usually the PVC suspension is, after degassing, dewatered in a decanter, whereupon the residual moisture content of the PVC product drops to from 10 to 30%. The decanted reaction mixture typically has a solids content of from 50 to 250 mg/l and is usually, after preliminary separation, sent to a biological purification plant in the form of waste water. The amount of waste water is, depending on the type of PVC produced, between 2.3 and 3.0 $m^3$ per tonne of PVC.

It is well known in the technical field that, in the polymerisation of vinyl-containing monomers such as, for example, vinyl chloride, using the suspension process, the product quality of the PVC produced is adversely affected by impurities. For that reason, only high-purity solvents are used for the reaction mixture in the discontinuous polymerisation processes customary today; for example, fresh fully demineralised water is used as solvent in the polymerisation of vinyl chloride to PVC. In addition to the costs associated with the provision of fresh high-purity solvents such as, for example, fresh fully demineralised water, the costs then associated with the environmentally acceptable disposal of the used solvent or waste water also have a disadvantageous effect on the economy of the process.

It is accordingly a problem of the present invention to make available a process for the polymerisation of vinyl-containing monomers by means of which process the disadvantages of the prior art are avoided. It is also a problem of the invention to provide an apparatus for carrying out a polymerisation process of such a kind.

The problem is solved by the subject-matter of the independent and dependent claims and of the description in conjunction with the Figures. The invention makes it possible to overcome the above-mentioned disadvantages of the prior art.

The invention accordingly relates to a polymerisation process in which vinyl-containing monomers, especially monomeric vinyl halides, are polymerised in a reaction mixture, at least one polymerisation product is separated off from the reaction mixture, and the reaction mixture is then purified and used again. As a result of the process according to the invention, compared to the prior art, less fresh high-purity solvent, especially fresh fully demineralised water, is required per tonne of polymer product produced, and consequently less waste and/or waste water is generated and as a result operation is especially economical and environmentally friendly.

Any known process for the polymerisation of vinyl-containing monomers in a reaction mixture can be used therein. In accordance with the invention, the expression "polymerisation" includes both homopolymerisation of monomers and also copolymerisation of two or more different monomers.

In accordance with the invention preference is given to separating off exactly one polymerisation product, which may also be a polymer mixture having a statistical distribution, such as, for example, PVC.

Preferably, the reaction mixture comprises, in addition to the monomers used and at least one solvent and also the products formed in the course of polymerisation, further constituents and additives, preferably initiators, antifoams, neutralising agents, suspension agents, antioxidants etc. In addition, the invention relates to an apparatus which allows the process according to the invention to be carried out.

The polymerisation of vinyl-containing monomers, vinyl halides and especially vinyl chloride is known per se. It will furthermore be known to the skilled person that the recovered water produced in customary polymerisation processes cannot, because of the micropolymers present therein, be used again in a subsequent reaction, because those micropolymers act as polymerisation seeds and irreparably impair the quality of the polymerisation product.

However, it has now been found, surprisingly, that by means of the process according to the invention products are produced which have characteristics that are as good as those of products produced using customary processes whilst the amount of used solvent waste that is generated is substantially reduced in comparison with the customary production process. As a result it is possible both to reduce advantageously the costs for the provision of fresh high-purity solvent and also the costs for the environmentally acceptable disposal of the used solvent waste generated and also to produce the polymer product in especially economical manner. Preferably, all the purified reaction mixture is used again, although use of part thereof in combination with fresh solvent is also possible.

It has also been found, surprisingly, that, using the process of the invention, repeated production of polymerisation product of a consistent quality is possible, in which case as a result of the recovery and re-use of the solvent-comprising reaction mixture the costs can be reduced for especially economical production of polymer products.

Furthermore, the consistent quality of the polymerisation products can be especially well controlled by the present invention. Preferably, vinyl chloride is used as monomeric vinyl halide, in which case the polymer produced can consist of or comprise, for example, 50% to 100% polyvinyl chloride. Also preferably, identical or different monomer units can be polymerised in accordance with the invention to form a homo-, co- and/or ter-polymer etc. Polymer products produced by the process according to the invention advantageously contain no impurities. As a result of selection of the filter medium having a separation limit of 10-1000 kDalton, very fine polymer particles are filtered out of the polymerisation mixture before it is returned to the process. It is also possible in the method according to the invention for residual monomers to be returned, at least partially, to the polymerisation process so that the yield is increased, and degassing needs less outlay in its performance or can be dispensed with entirely. As a result, the disposal of especially halogen-containing vinyl monomers is dispensed with partially or entirely.

In accordance with the invention, the polymerisation can be carried out in the reaction mixture in solution or in dispersion, that is to say starting materials and/or products of the reaction can be present, independently of one another, dissolved in the solvent and/or in the form of solids or liquids dispersed therein. Preference is given to carrying out the polymerisation reaction in the process according to the invention in an aqueous reaction mixture, and special preference is given to carrying out the polymerisation in the process according to the invention in an aqueous suspension. Special preference is given to using the process according to the invention for the polymerisation of vinyl chloride to form PVC in aqueous suspension. In that case, the aqueous reaction mixture can, especially advantageously, be purified and used again instead of fully demineralised water, without having to dispose of large amounts of waste water. Instead of fully demineralised water, the purified reaction mixture can be used again, entirely or partially, for the polymerisation of vinyl chloride.

The process of the invention can be carried out, for example, under a pressure that is higher than normal pressure, preferably under a pressure of from 0.3 to 2 MPa.

Preferably, the polymerisation is carried out discontinuously.

Preferably, the reaction mixture is degassed after polymerisation and before separating off the at least one polymerisation product. The degassing can be carried out in any known manner; preferably, the reaction mixture is degassed using a distillation column. As a result of the degassing of the reaction mixture, unreacted starting materials (monomers) can be recovered, which can be returned to the process (to the reactor).

Preferably, the at least one polymerisation product is separated off by centrifuging the reaction mixture. In that case, any known centrifugation method can be used. Preferably, a solid bowl centrifuge or a screen centrifuge is used.

Preferably, the reaction mixture is purified by filtration, preferably by microfiltration, after separating off the at least one reaction product. Filtration or microfiltration as understood by the invention refers to filter media having a separation limit of 10-1000 kDalton and filtrate yields of >99%.

In accordance with the invention, a microfiltration module can be a module conventional in the technical field, comprising, for example, filter elements in the form of tubes, plates or other constructional forms. As filter material there can be used, for example, ceramic, sintered metal or metal mesh, preferably polymer-coated filter elements. In addition, in order to increase the filtration performance, any conventional filtration aids can be used such as, for example, cellulose or diatomaceous earth. Plastic materials such as, for example, PVC, are likewise suitable as filtration aids.

It has been found, surprisingly, that a reaction mixture, for example the aqueous reaction mixture obtained on centrifuging an aqueous PVC suspension, which has been purified by microfiltration by way of a microfiltration module can be used again for the polymerisation of vinyl chloride without the characteristics of the product being impaired.

Preferably, in the process according to the invention the solids separated off by filtration or microfiltration can be returned to the reaction mixture before separating off the at least one polymerisation product. Surprisingly, it has been found, in particular, that PVC solid particles separated off in the process according to the invention can be introduced back into the process, as a result of which the amount of solid waste is reduced.

The apparatus provided for carrying out the process according to the invention is a reaction vessel (reactor) (1) which is connected by way of a fluid connection to an apparatus (5) for separating off a polymerisation product from the reaction mixture, the apparatus (5) for separating off a polymerisation product from the reaction mixture being connected by way of a further fluid connection to an apparatus (7) for purifying the reaction mixture, and the apparatus (7) for purifying the reaction mixture being connected by way of a further fluid connection to the reaction vessel (1). The apparatus (5) for separating off a polymerisation product is preferably a centrifuge. The apparatus (7) for purifying the reaction mixture is preferably a filtration apparatus, especially a microfiltration apparatus. Special preference is given to the microfiltration apparatus comprising filter elements in the form of plates or tubes.

The present invention overcomes the disadvantages of the prior art, especially in that, in comparison to the prior art, less fresh high-purity solvent, especially fresh fully demineralised water, is required per tonne of polymer product produced, less waste and/or waste water is consequently generated, and the solution according to the invention is, as a result, especially economical and environmentally friendly without the characteristics of the product being impaired. Also, the consistent quality of the polymerisation products can be especially well controlled by means of the present invention.

DESCRIPTION OF THE FIGURES

The invention is explained hereinbelow with reference to Figures showing preferred embodiments of the apparatus according to the invention. Components having the same functions are referred to in the Figures by the same reference numerals.

Figure 1:
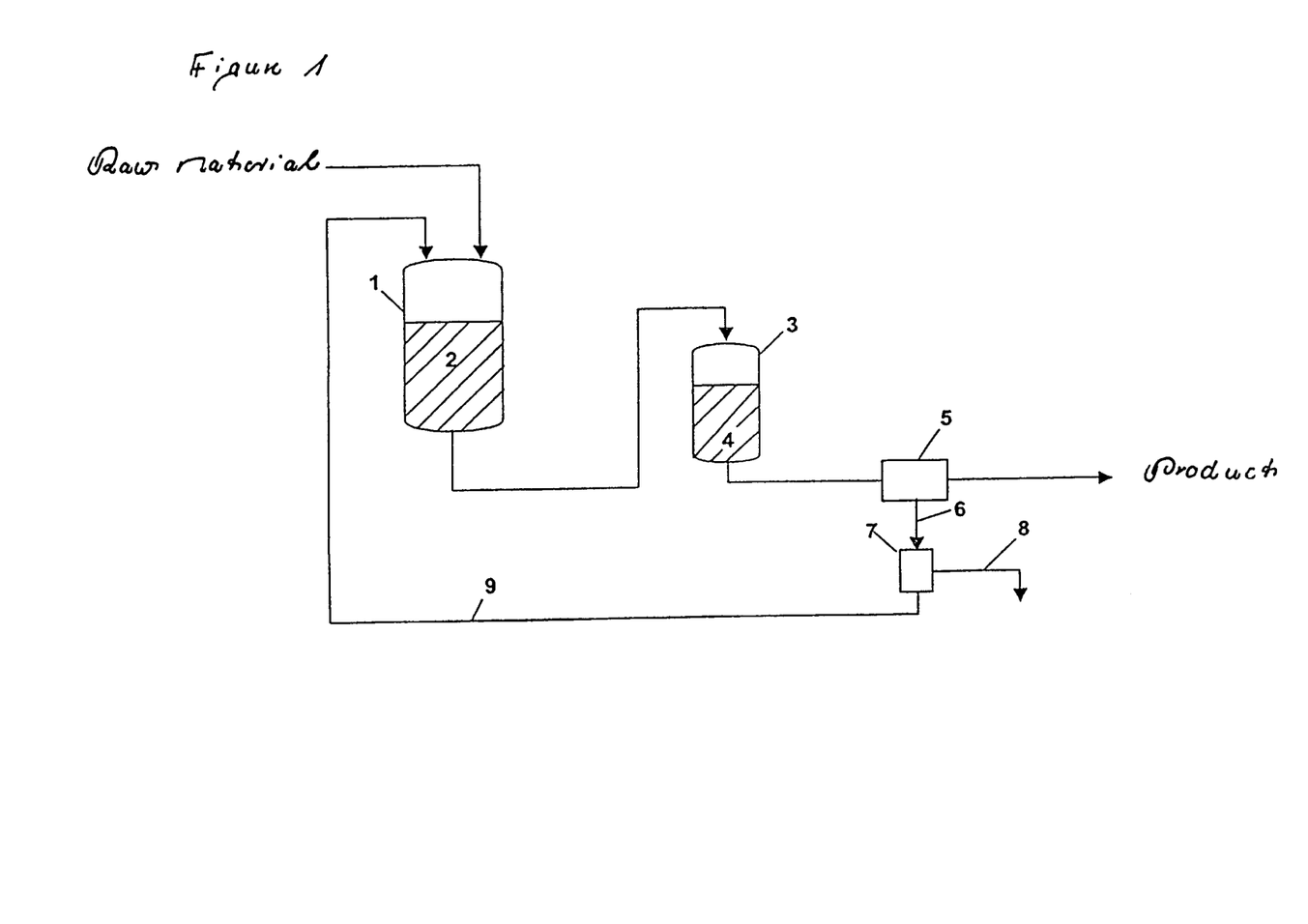

FIG. 1 shows a flow diagram of an embodiment of the apparatus according to the invention. After polymerisation, a reaction mixture 2 produced in the polymerisation reactor 1 is passed on to degassing 3. The degassed reaction mixture 4 is mechanically separated from a polymerisation product in a centrifuge 5. The reaction mixture 6 separated off is freed of solids 8 in a plate filter 7. The purified reaction mixture 9 is returned to the polymerisation reactor 1.

Figure 2:
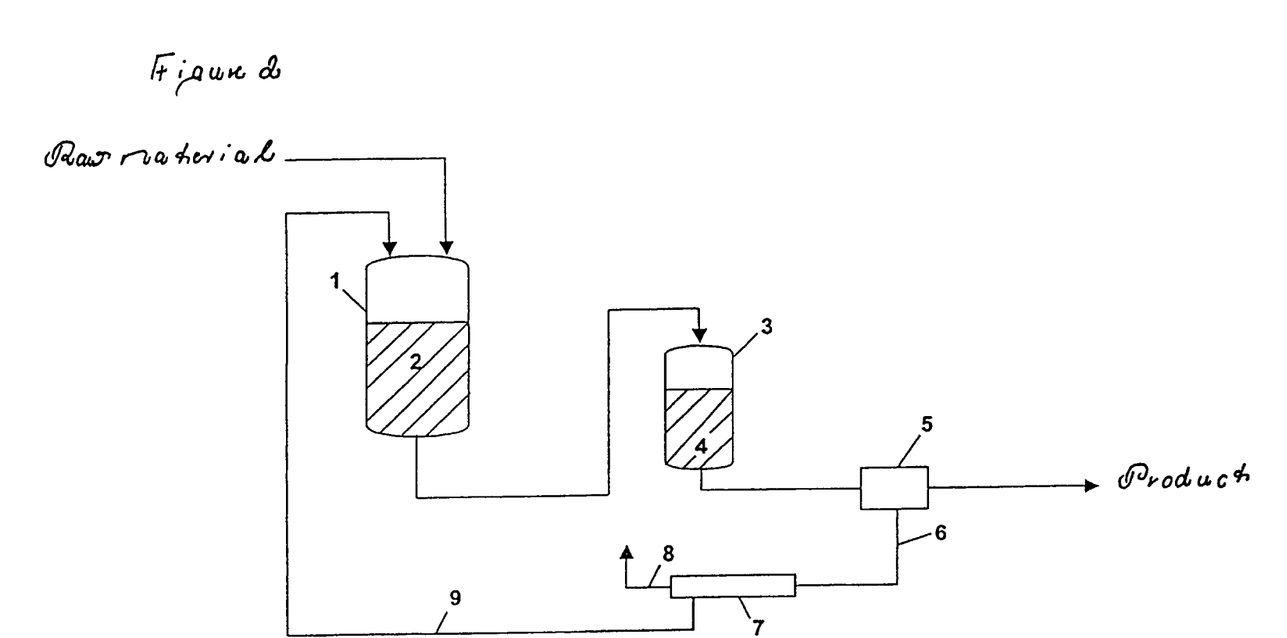

FIG. 2 shows a flow diagram of a further embodiment of the apparatus according to the invention. After polymerisation, a reaction mixture 2 produced in the polymerisation reactor 1 is passed on to degassing 3. The degassed reaction mixture 4 is mechanically separated from a polymerisation product in a centrifuge 5. The reaction mixture 6 separated off is freed of solids 8 in a tube module filter 7. The purified reaction mixture 9 is returned to the polymerisation reactor 1.

FIG. 3 shows a flow diagram of a further embodiment of the apparatus according to the invention. After polymerisation, a reaction mixture 2 produced in the polymerisation reactor 1 is passed on to degassing 3. The degassed reaction mixture 4 is mechanically separated from a polymerisation product in a centrifuge 5. The reaction mixture 6 separated off is freed of solids 8 in a plate filter 7. The purified reaction mixture 9 is returned to the polymerisation reactor 1. The solids 8 separated off are passed on to the centrifuge 5 together with the degassed suspension 4.

Figure 4:
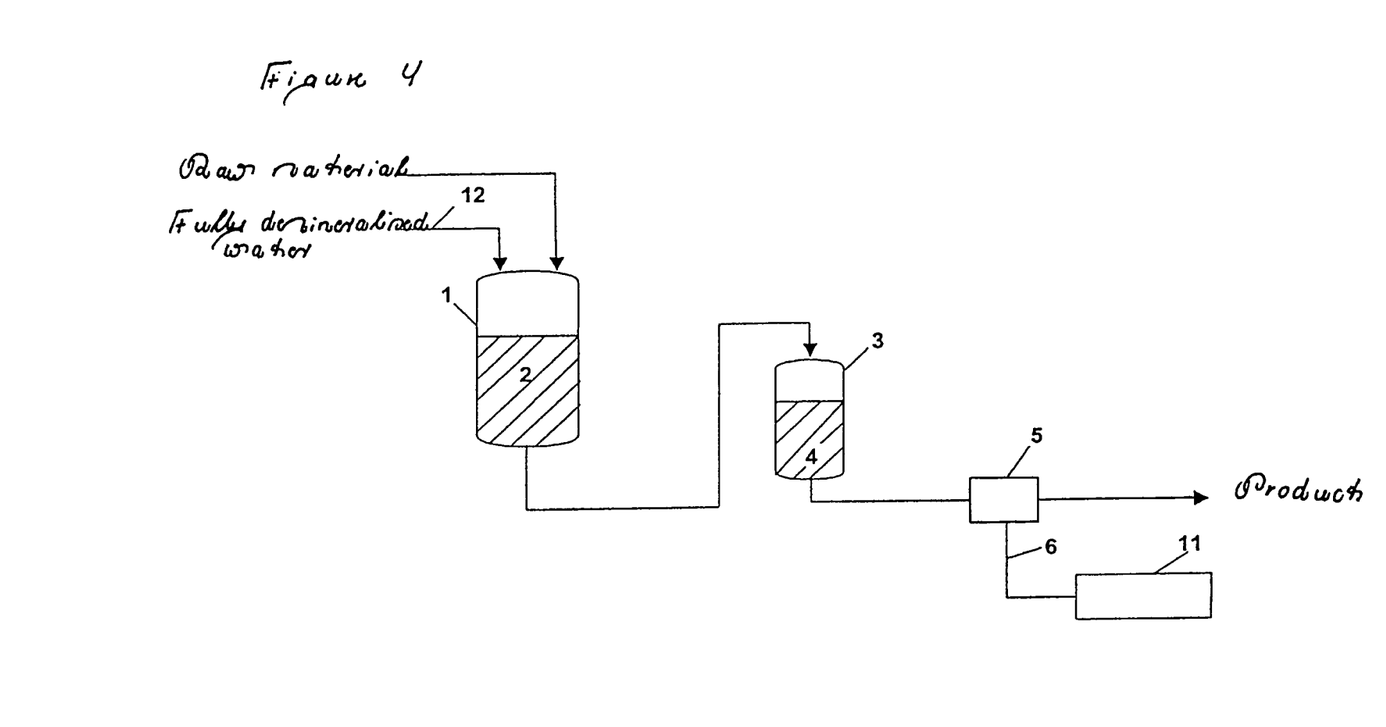

FIG. 4 shows a flow diagram of a conventional apparatus in which a reaction mixture 2 produced in a polymerisation reactor 1 using fresh fully demineralised water 12 is, after polymerisation, passed on to degassing 3. The degassed reaction mixture 4 is mechanically dewatered in a centrifuge 5 and a polymerisation product is separated off. The waste water 6 separated off is passed on to waste water treatment 11.

EXAMPLES

Comparison Example 1

S-PVC, K-value 70

Polymerisation of vinyl chloride was carried out at a temperature of 53° C. using the conventional apparatus outlined in FIG. 4. After degassing, the suspension produced was mechanically dewatered in a centrifuge and the polymerisation product was separated off. The powder characteristics of the polymerisation product are collated in Table 1.

TABLE 1

Powder characteristics of S-PVC, K-value 70

| S-PVC, K-value 70 | Unit | Comparison, using fully demineralised water |
|---|---|---|
| K-value | [-] | 69.9 |
| Bulk density | [g/l] | 472 |
| Porosity | [%] | 30.6 |
| Average particle diameter | [µm] | 127 |
| Sieve residue >63 | [%] | 99.7 |
| Sieve residue >125 | [%] | 65.9 |
| Sieve residue >250 | [%] | 0.4 |
| Measure of the width of particle distribution | [-] | 2.33 |

Comparison Example 2

S-PVC, K-Value 68

Polymerisation of vinyl chloride was carried out at a temperature of 53° C. using the conventional apparatus outlined in FIG. 4. After degassing, the suspension produced was mechanically dewatered in a centrifuge and the polymerisation product was separated off. The powder characteristics of the polymerisation product are collated in Table 2.

TABLE 2

Powder characteristics of S-PVC, K-value 68

| S-PVC, K-value 68 | Unit | Comparison, using fully demineralised water |
|---|---|---|
| K-value | [-] | 66.1 |
| Bulk density | [g/l] | 552 |
| Porosity | [%] | 21.6 |
| Average particle diameter | [µm] | 179.8 |
| Sieve residue >63 | [%] | 100 |
| Sieve residue >250 | [%] | 13.5 |
| Sieve residue >355 | [%] | 0.5 |
| Measure of the breadth of particle distribution | [-] | 2.22 |

Example 1

S-PVC, K-Value 70

Polymerisation of vinyl chloride was carried out at a temperature of 53° C. in an aqueous reaction mixture in a reactor, using the process of the invention outlined in FIG. 1. After degassing, the reaction mixture produced was mechanically dewatered in a centrifuge and a polymerisation product was separated off. The reaction mixture emerging from the centrifuge was filtered over a conventional plate module. The solid filtered off was disposed of, and the filtered reaction mixture was returned to the reactor and used again for further polymerisation. The procedure was repeated several times for this PVC type. The quality of the filtered reaction mixture (Table 3) and the product quality (Table 4) changed only very slightly as a result of using the reaction mixture several times; in particular, the powder characteristics of the product were not subject to any significant change.

TABLE 3

Test data of filtered reaction mixture

| PVC type: S-PVC, K-value 70 | Unit | Batch 1 | Batch 2 | Batch 3 |
|---|---|---|---|---|
| Solids content before filtration | [mg/l] | 150 | 140 | 130 |
| Solids content after filtration | [mg/l] | <1 | 1.1 | <1 |
| Content of chloride ions | [mg/l] | 29 | 30 | 32 |
| Conductivity | [µs/cm] | 126 | 130 | 132 |
| Surface tension | [m/m] | 63.6 | 61.4 | 63 |

TABLE 4

Powder characteristics of S-PVC, K-value 70

| S-PVC, K-value 70 | Unit | Batch 1 | Batch 2 | Batch 3 |
|---|---|---|---|---|
| K-value | [-] | 70.1 | 69.9 | 69.4 |
| Bulk density | [g/l] | 472 | 480 | 473 |
| Porosity | [%] | 33.8 | 34.2 | 32.7 |
| Average particle diameter | [µm] | 127 | 130 | 127.2 |
| Sieve residue >63 | [%] | 99.7 | 99.2 | 99.7 |
| Sieve residue >125 | [%] | 65.9 | 65.6 | 66.2 |
| Sieve residue >250 | [%] | 0.4 | 0.4 | 0.3 |
| Measure of the breadth of particle distribution | [-] | 2.28 | 2.19 | 2.19 |

Example 2

S-PVC, K-Value 68

Polymerisation of vinyl chloride was carried out at a temperature of 53° C. in an aqueous reaction mixture in a reactor, using the process of the invention outlined in FIG. 1. After degassing, the reaction mixture produced was mechanically dewatered in a centrifuge and a polymerisation product was separated off. The reaction mixture emerging from the centrifuge was filtered over a conventional plate module. The solid filtered off was disposed of, and the filtered reaction mixture was returned to the reactor and used again for further polymerisation. The procedure was repeated several times for this PVC type. The quality of the filtered reaction mixture (Table 5) and the product quality (Table 6) changed only very slightly as a result of using the reaction mixture several times; in particular, the powder characteristics of the product were not subject to any significant change.

TABLE 5

Test data of filtered reaction mixture

| PVC type: S-PVC, K-value 68 | Unit | Batch 1 | Batch 2 | Batch 3 |
|---|---|---|---|---|
| Solids content before filtration | [mg/l] | 110 | 120 | 105 |
| Solids content after filtration | [mg/l] | <1 | <1 | <1 |
| Content of chloride ions | [mg/l] | 23 | 25 | 26 |
| Conductivity | [µs/cm] | 126 | 129 | 130 |
| Surface tension | [m/m] | 62.6 | 63.4 | 62.8 |

TABLE 6

Powder characteristics of S-PVC, K-value 68

| S-PVC, K-value 68 | Unit | Batch 1 | Batch 2 | Batch 3 |
|---|---|---|---|---|
| K-value | [-] | 66.3 | 66.1 | 66.7 |
| Bulk density | [g/l] | 552 | 549 | 548 |
| Porosity | [%] | 21.7 | 21.6 | 21.3 |
| Average particle diameter | [μm] | 179.8 | 178.3 | 179.6 |
| Sieve residue >63 | [%] | 100 | 100 | 100 |
| Sieve residue >250 | [%] | 13.5 | 15.4 | 17.3 |
| Sieve residue >355 | [%] | 0.5 | 0.3 | 0.2 |
| Measure of the breadth of particle distribution | [-] | 2.22 | 2.18 | 2.26 |

Example 3

S-PVC, K-Value 70

Polymerisation of vinyl chloride was carried out at a temperature of 53° C. in an aqueous reaction mixture in a reactor, using the process of the invention outlined in FIG. 2. After degassing, the reaction mixture produced was mechanically dewatered in a centrifuge and a polymerisation product was separated off. The reaction mixture emerging from the centrifuge was filtered over a conventional tube module. The solid filtered off was disposed of, and the filtered reaction mixture was returned to the reactor and used again for further polymerisation. The procedure was repeated several times for this PVC type. The quality of the filtered reaction mixture (Table 7) and the product quality (Table 8) changed only very slightly as a result of using the reaction mixture several times; in particular, the powder characteristics of the product were not subject to any significant change.

TABLE 7

Test data of filtered waste water

| PVC type: S-PVC, K-value 70 | Unit | Batch 1 | Batch 2 | Batch 3 |
|---|---|---|---|---|
| Solids content before filtration | [mg/l] | 130 | 140 | 120 |
| Solids content after filtration | [mg/l] | <1 | <1 | <1 |
| Content of chloride ions | [mg/l] | 28.2 | 31 | 32.5 |
| Conductivity | [μs/cm] | 128 | 129 | 131 |
| Surface tension | [m/m] | 61.6 | 61.9 | 62.2 |

TABLE 8

Powder characteristics of S-PVC, K-value 70

| S-PVC, K-value 70 | Unit | Batch 1 | Batch 2 | Batch 3 |
|---|---|---|---|---|
| K-value | [-] | 70.1 | 69.6 | 69.7 |
| Bulk density | [g/l] | 482 | 476 | 474 |
| Porosity | [%] | 32.8 | 33.2 | 31.7 |
| Average particle diameter | [μm] | 126 | 128 | 127.2 |
| Sieve residue >63 | [%] | 99.9 | 99.8 | 99.7 |
| Sieve residue >125 | [%] | 66.9 | 64.6 | 66.2 |
| Sieve residue >250 | [%] | 0.3 | 0.4 | 0.3 |
| Measure of the breadth of particle distribution | [-] | 2.19 | 2.22 | 2.21 |

Example 4

S-PVC, K-Value 70

Polymerisation of vinyl chloride was carried out at a temperature of 53° C. in an aqueous reaction mixture in a reactor, using the process of the invention outlined in FIG. 3. After degassing, the reaction mixture produced was mechanically dewatered in a centrifuge and a polymerisation product was separated off. The reaction mixture emerging from the centrifuge was filtered over a conventional plate module. The solid filtered off was disposed of, and the filtered reaction mixture was returned to the reactor and used again for further polymerisation. The procedure was repeated several times for this PVC type. The quality of the filtered reaction mixture (Table 9) and the product quality (Table 10) changed only very slightly as a result of using the reaction mixture several times; in particular, the powder characteristics of the product were not subject to any significant change.

TABLE 9

Test data of filtered waste water

| PVC type: S-PVC, K-value 70 | Unit | Batch 1 | Batch 2 | Batch 3 |
|---|---|---|---|---|
| Solids content before filtration | [mg/l] | 130 | 160 | 140 |
| Solids content after filtration | [mg/l] | <1 | <1 | <1 |
| Content of chloride ions | [mg/l] | 32 | 34 | 33 |
| Conductivity | [μs/cm] | 129 | 134 | 133 |
| Surface tension | [m/m] | 65.6 | 64.4 | 63.5 |

TABLE 10

Powder characteristics of S-PVC, K-value 70

| S-PVC, K-value 70 | Unit | Batch 1 | Batch 2 | Batch 3 |
|---|---|---|---|---|
| K-value | [-] | 69.7 | 69.8 | 69.5 |
| Bulk density | [g/l] | 475 | 472 | 471 |
| Porosity | [%] | 32.8 | 33.4 | 33.1 |
| Average particle diameter | [μm] | 122 | 124 | 125.2 |
| Sieve residue >63 | [%] | 99.1 | 99.3 | 99.2 |
| Sieve residue >125 | [%] | 64.9 | 64.6 | 65.2 |
| Sieve residue >250 | [%] | 0.2 | 0.3 | 0.2 |
| Measure of the breadth of particle distribution | [-] | 2.31 | 2.35 | 2.29 |

From the Examples and Comparison Examples it can be seen that, using the process according to the invention, products of consistent quality can be produced without fresh fully demineralised water being required for each batch, as a result of which the production of PVC can be carried out with less waste water and, as a result, in especially economical and environmentally friendly manner without the characteristics of the product being impaired.

The invention claimed is:

1. A polymerisation process comprising steps of:
   (a) polymerizing vinyl-containing monomers in an aqueous reaction mixture,
   (b) separating at least one polymerization product from the aqueous reaction mixture, and
   (c) after separating the at least one polymerization product, purifying the aqueous reaction mixture by filtration or microfiltration
   (d) repeating steps (a), (b) and (c) using the purified reaction mixture obtained in step (c),
   wherein solids separated by filtration or microfiltration are returned to the reaction mixture prior to repeating step (b).

2. A process of claim 1 wherein a monomeric vinyl halide is used as vinyl-containing monomer.

3. A process of claim 1 wherein the vinyl-containing monomer comprises a vinyl chloride compound.

4. A process of claim 1 wherein the aqueous reaction mixture is an aqueous suspension.

5. A process of claim 1 wherein the polymerisation is carried out discontinuously.

6. A process of claim 1 wherein the polymerisation is carried out at a pressure of from 0.3 to 2 MPa.

7. A process of claim 1 wherein the reaction mixture is degassed after polymerisation and before separating off the at least one polymerisation product.

8. A process of claim 1 wherein the at least one polymerisation product is separated off by centrifuging the reaction mixture.

9. A process of claim 1 wherein the filter media used for the filtration or microfiltration has a separation limit of 10-1000 kDalton.

10. A polymerisation process comprising:
    (a) polymerizing a vinyl chloride compound in an aqueous reaction mixture,
    (b) separating at least one polymerization product from the reaction mixture, and
    (c) after separating the at least one polymerization product, purifying the reaction mixture by filtration or microfiltration
    (d) repeating steps (a), (b) and (c) using the purified reaction mixture obtained in step (c),
    wherein solids separated by filtration or microfiltration are returned to the reaction mixture prior to repeating step (b).

* * * * *